(12) United States Patent
You et al.

(10) Patent No.: US 11,557,993 B2
(45) Date of Patent: Jan. 17, 2023

(54) MOTOR-DRIVING CONTROL SYSTEM AND METHOD

(71) Applicants: Hyundai Motor Company, Seoul (KR); Kia Motors Corporation, Seoul (KR)

(72) Inventors: Chang Seok You, Gyeonggi-do (KR); Joo Yeon Kim, Seoul (KR); Sung Do Kim, Seoul (KR); Min Su Kang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 16/952,460

(22) Filed: Nov. 19, 2020

(65) Prior Publication Data

US 2022/0029564 A1 Jan. 27, 2022

(30) Foreign Application Priority Data

Jul. 24, 2020 (KR) ........................ 10-2020-0092421

(51) Int. Cl.
| | |
|---|---|
| *H02P 6/00* | (2016.01) |
| *H02P 6/16* | (2016.01) |
| *H02P 6/28* | (2016.01) |
| *H02P 6/17* | (2016.01) |
| *B60L 15/20* | (2006.01) |
| *H02P 6/182* | (2016.01) |
| *B60L 50/70* | (2019.01) |

(52) U.S. Cl.
CPC ................. *H02P 6/28* (2016.02); *B60L 15/20* (2013.01); *H02P 6/17* (2016.02); *H02P 6/182* (2013.01); *B60L 50/70* (2019.02); *B60L 2240/421* (2013.01); *B60L 2240/427* (2013.01)

(58) Field of Classification Search
CPC .... H02P 6/28; H02P 6/17; H02P 6/182; B60L 15/20
USPC ..................................................... 318/400.35
See application file for complete search history.

(56) References Cited

U.S. PATENT DOCUMENTS

| | | | |
|---|---|---|---|
| 8,340,848 B2 * | 12/2012 | Son ........................ | H02P 21/141 318/807 |
| 2007/0145919 A1 | 6/2007 | Hamaoka et al. | |
| 2008/0265817 A1 | 10/2008 | Palma | |
| 2013/0231891 A1 * | 9/2013 | Long ........................ | H02P 23/12 702/145 |

(Continued)

FOREIGN PATENT DOCUMENTS

| | | |
|---|---|---|
| JP | 6514164 B2 | 5/2019 |
| KR | 10-0408061 | 1/2003 |

(Continued)

*Primary Examiner* — Erick D Glass
(74) *Attorney, Agent, or Firm* — Fox Rothschild LLP (57) ABSTRACT

A motor-driving control system includes an actuator configured to generate rotational force by driving received current, a current provider configured to provide current to the actuator while repeatedly turning on and off the current at a preset period and duty, and a controller configured to estimate a rotation position or a rotation speed of the actuator in a section in which the current of the current provider is turned on or off and to control the current provider to follow a speed command based on the estimated rotation position or rotation speed.

15 Claims, 7 Drawing Sheets

(56) References Cited

U.S. PATENT DOCUMENTS

| | | | | |
|---|---|---|---|---|
| 2014/0292237 A1* | 10/2014 | Yamazaki | ............... | H02P 6/32 |
| | | | | 318/400.33 |
| 2015/0084576 A1* | 3/2015 | Magee | ................. | H02P 6/183 |
| | | | | 318/768 |
| 2017/0070172 A1 | 3/2017 | Je et al. | | |
| 2019/0190416 A1* | 6/2019 | Lee | ........................ | H02P 6/17 |

FOREIGN PATENT DOCUMENTS

| KR | 10-2014-0073735 A | 6/2014 |
|---|---|---|
| KR | 10-2015-0026265 A | 3/2015 |
| KR | 10-2017-0106025 A | 9/2017 |

\* cited by examiner

MOTOR-DRIVING CONTROL SYSTEM AND METHOD

CROSS-REFERENCE TO RELATED APPLICATION

This application claims under 35 U.S.C. § 119(a) the benefit of Korean Patent Application No. 10-2020-0092421, filed Jul. 24, 2020 in the Korean Intellectual Property Office, the entire contents of which are incorporated by reference herein.

BACKGROUND

1. Technical Field

The present disclosure relates to a motor-driving control system and method, more particularly, to a system and method for estimating a position and speed of a motor when current applied to the motor is controlled to be turned on and off.

2. Description of the Related Art

In a fuel-cell electric vehicle, an operating temperature of a fuel-cell stack increases and a humidity of supplied fuel decreases in an operating condition in which cooling performance is degraded, such as the case in which a vehicle is driven in a state of high output from the fuel-cell stack, for example, when the vehicle is driven uphill at a high temperature, and thus the fuel-cell stack is dried and a stack operating voltage decreases. In this case, a heating value of the fuel-cell stack increases due to the drop in stack operating voltage, creating a negative feedback loop of additional increases in operating temperature of the fuel cell.

Recently, in order to prevent the negative feedback loop of the increasing operating temperature of the fuel cell, control technology for increasing relative humidity at an air electrode (cathode) by increasing pressure of air supplied to the air electrode has been applied to a fuel cell system for a vehicle. Accordingly, there is a need to further increase a compression ratio of an air compressor for supplying the air toward the air electrode of the fuel-cell stack.

Since the compression ratio of the air supplied toward the air electrode of the fuel-cell stack needs to be further increased, an air compressor for achieving a maximum efficiency point at a maximum pressure operating point while further increasing the compression ratio of the air compressor has been designed. Such a design has a problem in that the efficiency of the compressor is increased in a section having a high flow and a high compression ratio but is degraded in a section having a relatively low flow. Accordingly, power consumption of the air compressor is increased in the section having the low flow, which is the main driving region, when a vehicle is driven in the city (e.g., stop and go driving conditions), which adversely affects the fuel efficiency of the vehicle.

In particular, a pressurized air compressor having an air compression ratio higher than that of a conventionally used ambient-pressure air blower is disadvantageous with regard to increasing the efficiency of the air compressor due to a difference in a driving speed of a motor between a section having a low flow and a section having a high flow, because the driving speed of the installed motor needs to be further increased. That is, the pressurized air compressor reduces inductance of the motor in order to ensure a sufficient voltage margin in a region in which the vehicle is driven at high speed along with the increase in the number of revolutions per minute (RPM) of the motor, and 3-phase ripple current is increased, thereby degrading the efficiency of a motor/inverter due to the reduction in the inductance of the motor. In particular, in the section having the low flow, which requires a relatively low output, 3-phase current is low and current ripple is increased, and thus efficiency is remarkably degraded. That is, 3-phase ripple current is a secondary component and does not contribute to torque of a motor, and thus the amount of 3-phase ripple current is relatively high compared with a 3-phase sine wave current component in a section having low flow and a small motor torque, and thus the efficiency of a motor/inverter is reduced compared with a section having high output.

An air foil bearing is applied to rotation of a motor of an air compressor for rotation at high speed, and the air foil bearing is required to rotate at predetermined speed or higher in order to maintain a lift state. Accordingly, when the air foil bearing continuously drives the motor at a speed equal to or less than a reference speed for maintaining the lift state, there is a problem in that the air foil bearing is damaged due to friction between the air foil bearing and a rotary axis of the motor. Accordingly, in order to prevent the air foil bearing from being damaged, the air compressor has a minimum driving-speed limit, and thus when a vehicle needs to be driven in the state in which output from a fuel cell is low, air is also unnecessarily and excessively supplied by driving the air compressor at the highest driving speed or greater, thereby reducing the efficiency of the fuel cell system.

Conventionally, a strategy of increasing the driving efficiency of an air compressor by repeatedly performing pulse width modulation (PWM) of switching the air compressor on/off in a section in which the vehicle is driven with low output is used. In particular, a position sensor such as a hall sensor is applied to a motor included in the air compressor, and thus the motor is switched on/off by recognizing the rotation speed and rotation position of the motor even if the motor is switched off.

However, in the case of a sensorless motor without a position sensor, the rotation speed and position of the motor are estimated by estimating counter-electromotive force when the current applied to the motor is controlled. However, the sensorless motor has a problem in that it is impossible to recognize the rotation speed or the rotation position of the motor because it is impossible to estimate the current and counter-electromotive force based thereon in a section in which PWM is controlled to be off. Accordingly, there is a problem in that a phenomenon of excessive oscillation of current applied to the motor occurs and control of the motor becomes unstable.

It will be understood that the above matters described in the related art are merely for promotion of understanding of the background of the disclosure, and should not be recognized as prior art that is well-known to those skilled in the art.

SUMMARY

Therefore, the present disclosure provides a system and method for estimating a rotation speed or a rotation position of a motor even in a section in which current is turned off when the current applied to a motor is controlled to be turned on and off.

In accordance with an aspect of the present disclosure, a motor-driving control system includes an actuator configured to generate rotational force by being driven using received current, a current provider configured to provide current to the actuator while repeatedly turning on and off the current at a preset period and duty, and a controller configured to estimate a rotation position or a rotation speed of the actuator in a section in which the current of the current provider is turned on and off and to control the current provider to follow a speed command based on the estimated rotation position or rotation speed.

The motor-driving control system may further include a sensor configured to sense the current or a voltage applied to the actuator from the current provider, wherein the controller may estimate a counter-electromotive force generated in the actuator using the current or the voltage sensed by the sensor, and may estimate the rotation position or the rotation speed of the actuator based on the counter-electromotive force in the section in which the current of the current provider is turned on.

The controller may estimate the rotation position or the rotation speed of the actuator based on an equation of motion in which a rotational force formed by driving the actuator is assumed to be 0 in the section in which the current of the current provider is turned off.

The controller may estimate the rotation speed of the actuator using a following equation in the section in which the current of the current provider is turned off:

$$\omega_n = \frac{\omega_{n-1} - \frac{\Delta t}{J} \cdot T_m}{1 + \frac{B \cdot \Delta t}{J}}$$

where $\omega_n$ is a current rotation speed, $\omega_{n-1}$ is a previous rotation speed, B is a damping coefficient of the actuator, J is an inertia moment coefficient of the actuator, $T_m$ is a load torque of the actuator, and $\Delta t$ is an estimated period of the rotation speed.

The load torque of the actuator may be estimated as a quadratic function for the rotation speed of the actuator using a following equation:

$$T_m = \alpha \omega_n^2 + \beta \omega_n$$

where $\alpha$ is a second-order coefficient, and $\beta$ is a first-order coefficient.

The actuator may be a motor installed in an aerodynamic force part or a hydraulic force part and the second-order coefficient $\beta$ and the first-order coefficient $\beta$ may be pre-mapped or preset depending on a pressure of the aerodynamic force part or the hydraulic force part.

The current provider may be an inverter configured to control pulse width modulation (PWM) of current in three phases (U phase, V phase, and W phase) in the actuator.

The controller may estimate the rotation position or the rotation speed of the actuator at a pulse width modulation (PWM) period in the section in which the current of the current provider is turned off.

The controller may include a speed controller configured to generate a current command based on the speed command and the estimated rotation speed, and a current controller configured to generate a voltage command of the current provider based on the current command and the estimated rotation position.

In accordance with another aspect of the present disclosure, there is provided a motor-driving control method including: providing current, by a current provider, to an actuator configured to generate a rotational force from the received current while repeatedly turning on and off the current at a preset period and duty; estimating, by a controller, a rotation position or a rotation speed of the actuator in a section in which the current of the current provider is turned on and off; and controlling, by the controller, the current provider to follow a speed command based on the estimated rotation position or rotation speed.

The motor-driving control method may further include, prior to estimating the rotation position or the rotation speed, checking whether the section is the section in which the current of the current provider is turned on or the section in which the current is turned off.

In the checking, when the current section is the section in which the current of the current provider is turned off, the estimating the rotation position or the rotation speed may include estimating the rotation position or the rotation speed of the actuator based on an equation of motion in which a rotational force formed by driving the actuator is assumed to be 0.

The actuator may be a motor installed in an aerodynamic force part or a hydraulic force part, and the estimating the rotation position or the rotation speed may include estimating the rotation position or the rotation speed of the actuator using a load torque received from the aerodynamic force part or the hydraulic force part by the actuator based on a previously estimated rotation speed of the actuator.

The providing of the current applied to the actuator while repeatedly turning on and off the current may include controlling pulse width modulation (PWM) of current in three phases (U phase, V phase, and W phase) in the actuator.

The estimating of the rotation position or the rotation speed may include estimating the rotation position or the rotation speed of the actuator at a pulse width modulation (PWM) period in the section in which the current of the current provider is turned off.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Particular structural and functional descriptions of embodiments of the present disclosure disclosed in the specification are only for the purpose of describing particular embodiments. The embodiments of the present disclosure are formed in many different forms and should not be construed as being limited to the embodiments set forth herein.

As the disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present disclosure.

It will be understood that when an element, such as a layer, a region, or a substrate, is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements or layers present. Other words used to describe the relationship between elements or layers should be interpreted in a like fashion, e.g., "between," versus "directly between," "adjacent," versus "directly adjacent," etc.

Unless otherwise defined, all terms including technical and scientific terms used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present disclosure will be described in detail by explaining exemplary embodiments of the disclosure with reference to the attached drawings. Like reference numerals in the drawings denote like elements.

Figure 1:
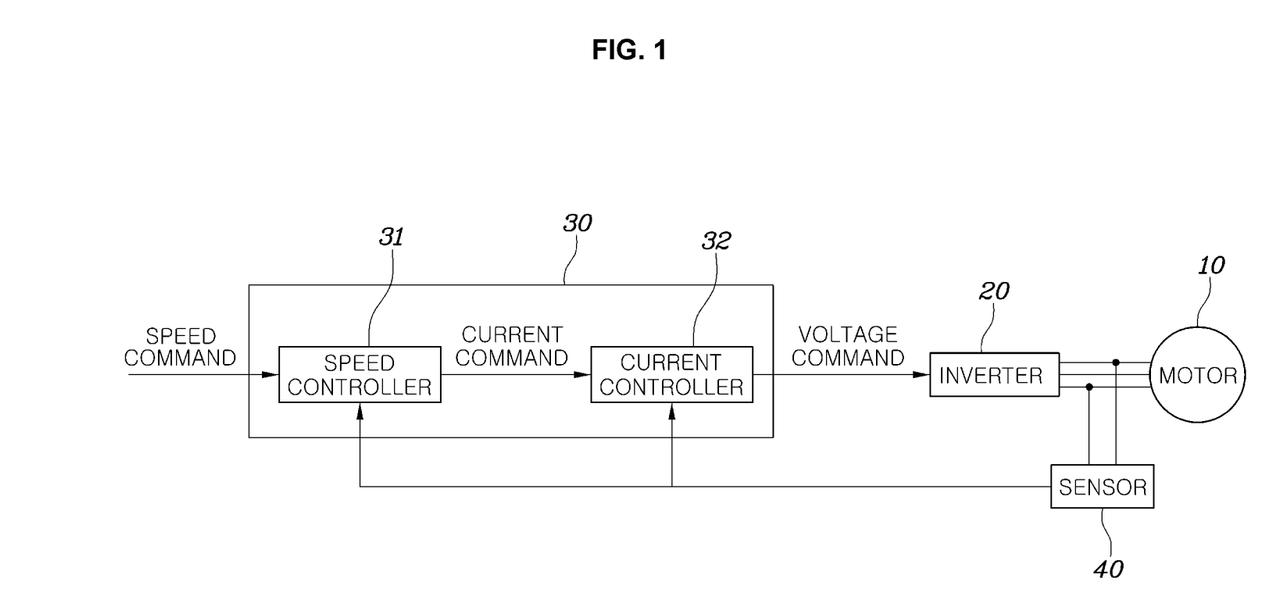
FIG. 1 is a diagram showing the configuration of a motor-driving control system according to an embodiment of the present disclosure.
Figure 2A:
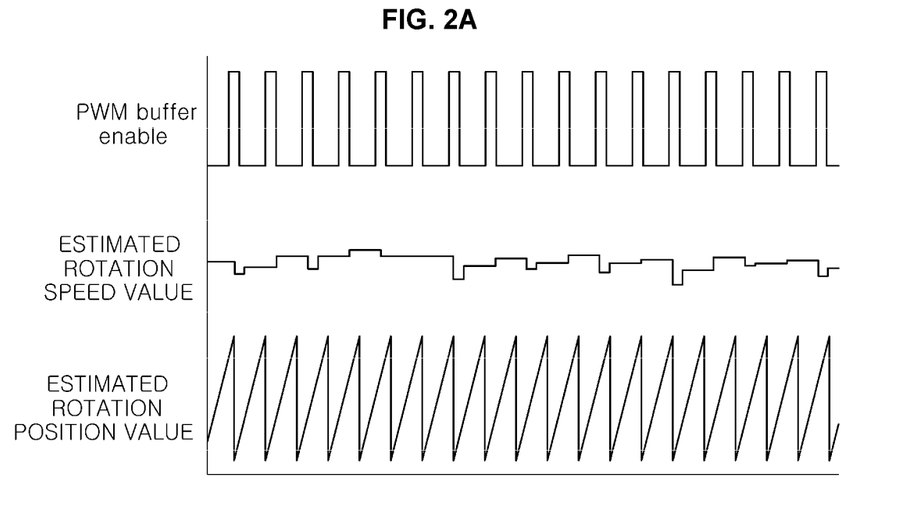
FIGS. 2A and 2B are graphs showing an estimated rotation speed and an estimated rotation position according to an embodiment of the present disclosure.
Figure 2B:
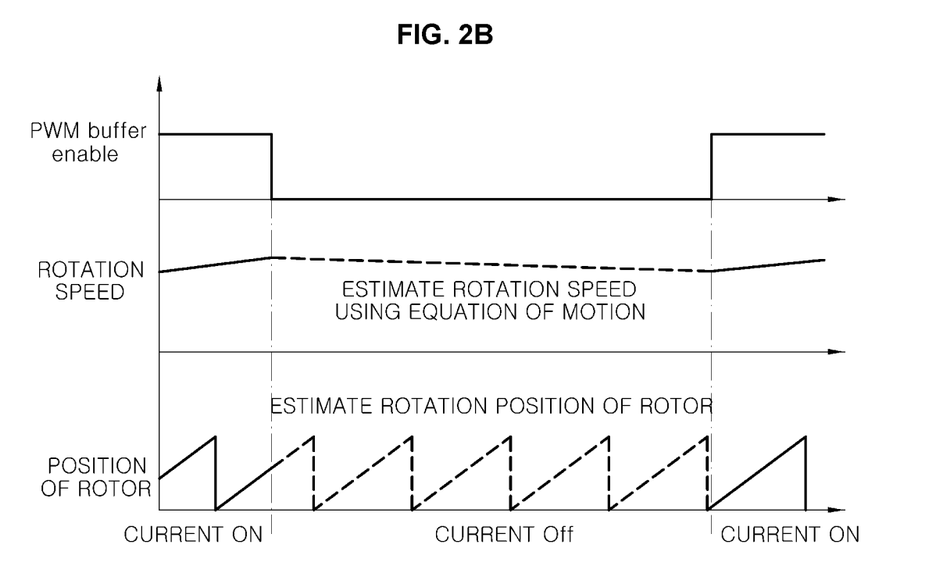

FIG. 1 is a diagram showing the configuration of a motor-driving control system according to an embodiment of the present disclosure. FIGS. 2A and 2B are graphs showing an estimated rotation speed and an estimated rotation position according to an embodiment of the present disclosure.

Referring to FIGS. 1 and 2A-2B, the motor-driving control system according to an embodiment of the present disclosure may include an actuator 10 for generating rotational force by driving received current, a current provider 20 for providing current to be applied to the actuator 10 while repeatedly turning on and off the current at a preset period and duty, and a controller 30 for estimating the rotation position or rotation speed of the actuator 10 in one or more sections in which the current of the current provider 20 is turned on and off and controlling the current provider 20 to follow a speed command based on the estimated rotation position or rotation speed.

The controller 30 according to an embodiment of the present disclosure may be embodied by a nonvolatile memory (not shown) configured to store an algorithm configured to control operations of various components of a vehicle or data of a software command for reproducing the algorithm, and a processor (not shown) configured to perform an operation to be described below using the data stored in the corresponding memory. Here, the memory and the processor may be embodied as separate chips. Alternatively, the memory and the processor may be embodied as a single integrated chip. The processor may be configured in the form of one or more processors.

The actuator 10 may be a motor that is driven by the current applied from the current provider 20, and may generate rotational force while being driven. That is, electrical rotational torque may be generated at an output shaft when the motor is driven.

The current provider 20 may perform control to turn on and off current in a section in which the actuator 10 rotates at low speed. Thus, driving efficiency for driving the actuator 10 may be increased. The period and the duty at which current is controlled to be turned on and off may be preset, for example, according to a speed command.

The period and the duty may be preset to a value for minimizing power consumption for driving the actuator 10. That is, when the current provider 20 performs control to repeatedly turn on and off driving current of the actuator 10, the period and duty for repetitive on/off control may be set to values for minimizing power consumption for each driving speed of the actuator 10 as well as switching loss and 3-phase current ripple of the current provider 20. The corresponding value may be determined through experimentation or the like, and the power consumption for each driving speed may be preset and stored in a map.

According to another embodiment of the present disclosure, the current provider 20 may continuously supply power in a section in which the actuator 10 rotates at high speed.

The controller 30 may control application of current by the current provider 20. In particular, the controller 30 may control the current provider 20 to follow a speed command that is received from a separate high-ranking controller 30. The controller 30 may control the application of current by the current provider 20 based on the rotation position or the rotation speed of the actuator 10.

Here, the rotation position or the rotation speed of the actuator 10 may refer to the rotation position or the rotation speed of an output shaft or a rotor of the actuator 10.

The controller 30 may estimate the rotation position or the rotation speed of the actuator 10 in one or more sections in which current of the current provider 20 is turned on and off. As described below, in the one or more sections in which current is turned on and off, the rotation position or the rotation speed of the actuator 10 may be estimated using different respective methods.

Conventionally, the rotation position or the rotation speed of the actuator 10 may be directly sensed using a hall sensor, an encoder, or the like. However, according to the present disclosure, when such sensors are not present or malfunction, the rotation position or the rotation speed of the actuator 10 may be estimated.

Accordingly, an effect of estimating the rotation speed and the rotation position of a motor in a section in which current of the motor is turned off may be achieved without a sensor for sensing the rotation speed and the rotation position of the motor. Accordingly, an effect of reducing the cost of the motor and simultaneously enhancing the operating efficiency of the motor and the stability of motor control may be achieved.

The motor-driving control system may further include a sensor 40 for sensing current applied to the actuator 10 from the current provider 20, and the controller 30 may estimate the counter-electromotive force generated in the actuator 10 using the current sensed by the sensor 40, and may estimate the rotation position or rotation speed of the actuator 10 based on the counter-electromotive force estimated in a section in which the current of the current provider 20 is turned on (a section in which PWM buffer enable is True).

The sensor 40 may be a current sensor and may sense the current applied to the actuator 10 from the current provider 20. In particular, as described below, the sensor 40 may sense current of three phases applied from the current provider 20 and may sense current of two or more phases among the three phases.

The controller 30 may estimate the counter-electromotive force of the actuator 10 in the section in which current of the current provider 20 is turned on and may estimate the rotation position or the rotation speed of the actuator 10 based on the estimated counter-electromotive force.

According to an embodiment, in the section in which the motor rotates at high speed, counter-electromotive force generated from a coil of a stator in each phase when the motor rotates, and information on the position of a rotor and the time of conversion of current in each phase using a zero-crossing (hereinafter, ZC) point of phase counter-electromotive force may be estimated.

Counter-electromotive force may be acquired by measuring a voltage at three-phase terminals, a neutral point may be calculated using an average value of the counter-electromotive force, and a ZC point, at which the neutral point and the counter-electromotive force cross each other, may be acquired.

Because the ZC point is generated six times per electrical rotation (360°) of a BLDC electric motor, the AC point is the basis for detecting a position at an interval of 60°, and thus an algorithm for detecting the position using the ZC point is referred to as a ZC algorithm.

According to another embodiment, in the section in which the motor rotates at low speed, when the speed of the motor is equal to or less than a predetermined speed, the controller may control the current provider 20 (inverter) to apply a zero (0) vector to the motor.

The controller may estimate the position of the rotor of the motor using the current that is generated when a zero vector is applied. In this case, the controller may estimate the position of the rotor of the motor using a phase value of current sensed by the sensor 40 after a zero vector is applied. That is, the controller may estimate the position of the rotor of the motor, which corresponds to the phase of the sensed current.

The controller 30 may estimate the rotation position or the rotation speed of the actuator 10 based on the equation of motion in which rotational force formed by driving the actuator 10 is assumed to be 0 in a section in which the current of the current provider 20 is turned off (a section in which PWM buffer enable is False).

In particular, the controller 30 may estimate the rotation speed of the actuator 10 using the following equation in the section in which the current of the current provider 20 is turned off.

$$\omega_n = \frac{\omega_{n-1} - \frac{\Delta t}{J} \cdot T_m}{1 + \frac{B \cdot \Delta t}{J}}$$

Here, $\omega_n$ is a current rotation speed, $\omega_{n-1}$ is a previous rotation speed, B is a damping coefficient of the actuator 10, J is an inertia moment coefficient of the actuator 10, $T_m$ is load torque of the actuator 10, and is an estimated period of the rotation speed.

Further, the rotation speed of the actuator 10 may satisfy the following equation of motion.

$$\frac{d\omega_n}{dt} = \frac{1}{J}(T_e - B\omega_n - T_m)$$

Here, $T_e$ is the electrical rotational torque of the actuator 10, and in a section in which current is turned off, the torque of the actuator 10 is 0, and thus $T_e$ may be assumed to be 0.

$$\frac{\omega_n - \omega_{n-1}}{\Delta t} = \frac{1}{J} \cdot (-B\omega_n - T_m)$$

This is summarized for $\omega_n$ using the following equation.

$$\omega_n = \frac{\omega_{n-1} - \frac{\Delta t}{J} \cdot T_m}{1 + \frac{B \cdot \Delta t}{J}}$$

Figure 3:
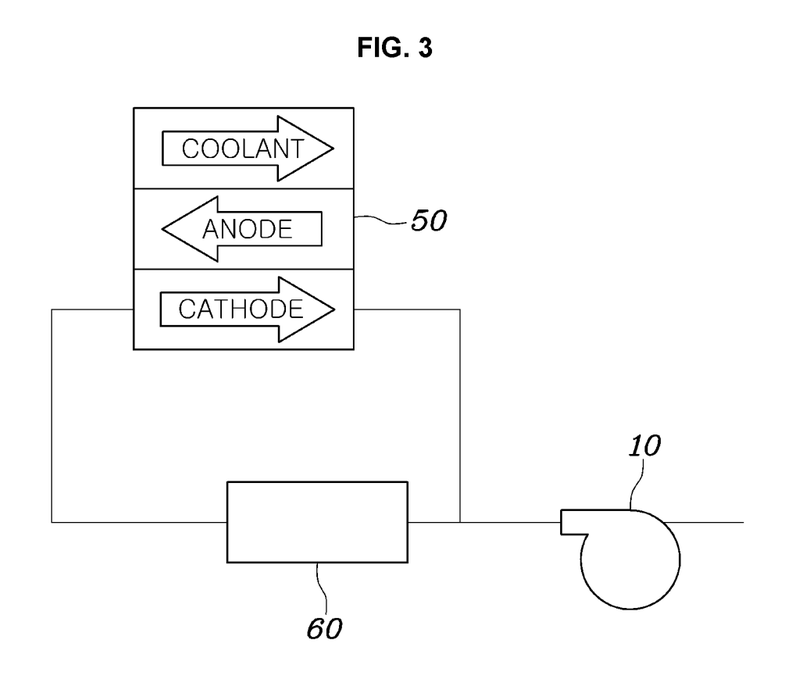
FIG. 3 is a diagram showing the configuration of an air-feeding system for a fuel cell including an actuator according to an embodiment of the present disclosure.
Figure 4:
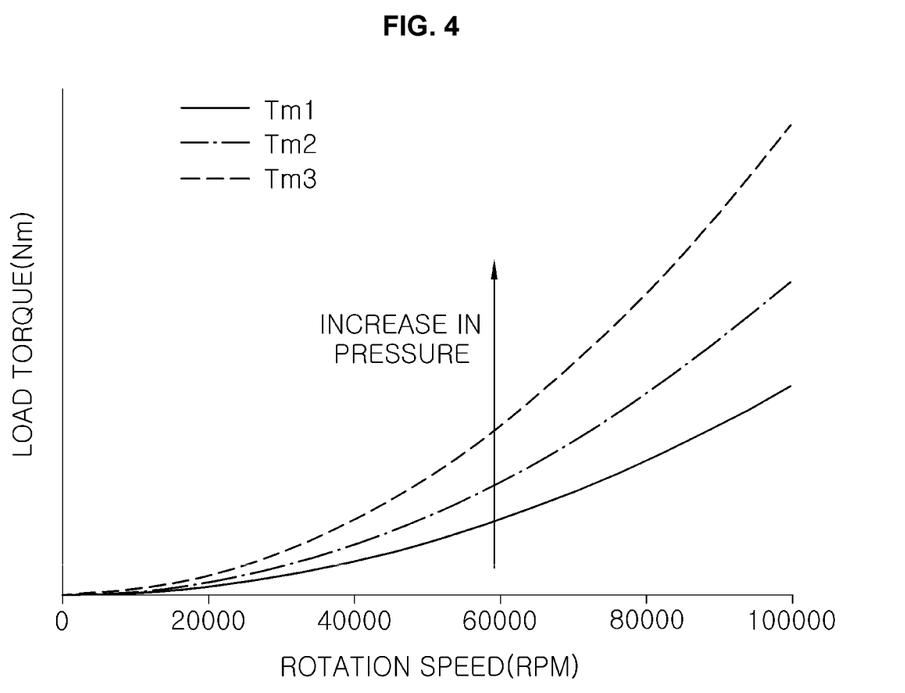
FIG. 4 is a graph of load torque for each rotation speed of an actuator according to an embodiment of the present disclosure.
Figure 5:
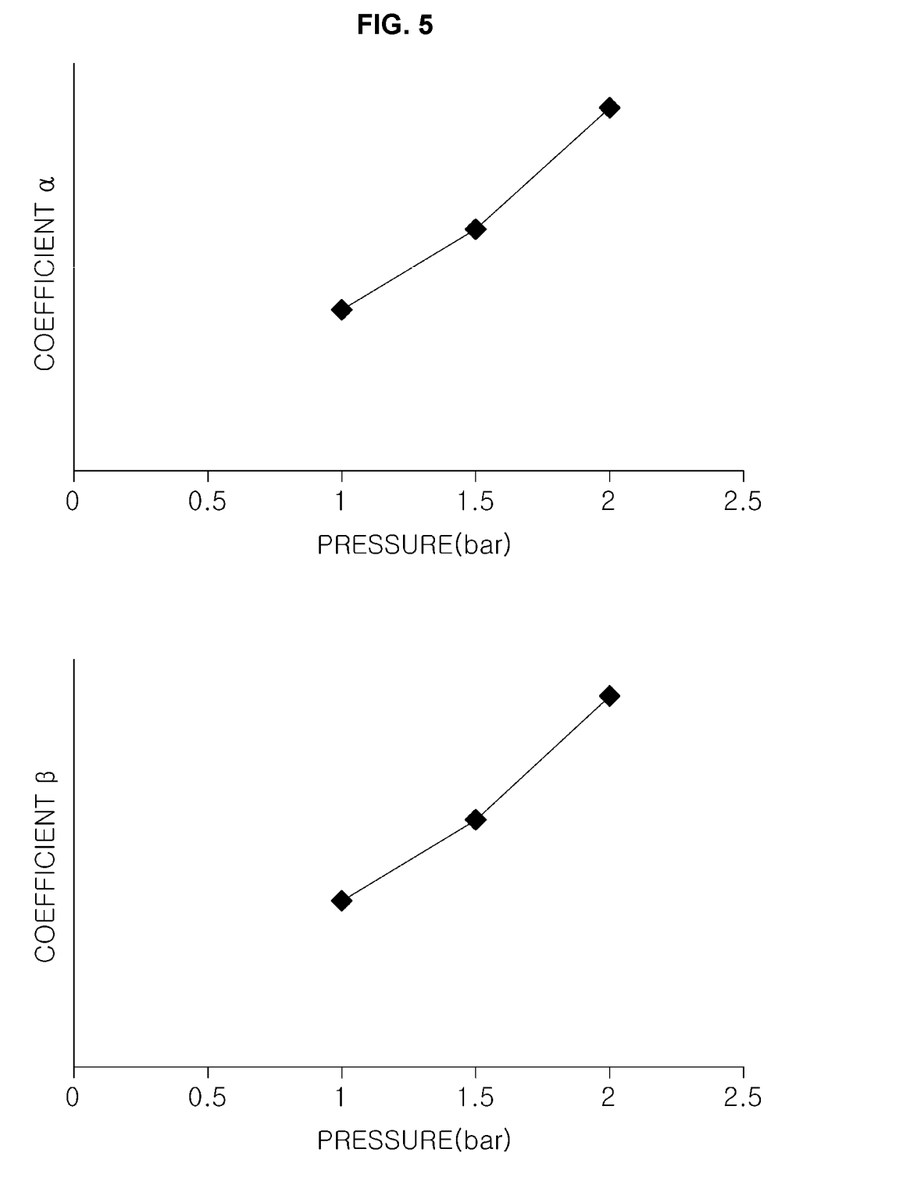
FIG. 5 is a graph of a primary coefficient and a secondary coefficient according to an embodiment of the present disclosure.

FIG. 3 is a diagram showing the configuration of an air-feeding system for a fuel cell including the actuator 10 according to an embodiment of the present disclosure. FIG. 4 is a graph of the load torque for each rotation speed of the actuator 10 according to an embodiment of the present disclosure. FIG. 5 is a graph of a primary coefficient and a secondary coefficient according to an embodiment of the present disclosure.

Further referring to FIGS. 3 to 5, the load torque of the actuator 10 may be estimated as a quadratic function for the rotation speed of the actuator 10 using the following equation.

$$T_m = \alpha \omega_n^2 + \beta \omega_n$$

Here, $\alpha$ is a second-order coefficient, and $\beta$ is a first-order coefficient.

In particular, the actuator 10 may be a motor installed in an aerodynamic force part or a hydraulic force part, and the second-order coefficient $\alpha$ and the first-order coefficient $\beta$ may be pre-mapped or preset depending on the pressure of the aerodynamic force part or the hydraulic force part.

According to an embodiment, as shown in FIG. 3, the actuator 10 may be an air compressor included in an air-feeding system for supplying air to a fuel cell 50. The actuator 10 may rotate to compress air as an output shaft thereof is positioned and driven in the air.

The air-feeding system may include a pressure regulator valve 60, which adjusts the pressure of the air supplied to the fuel cell 50 by adjusting the opening degree of the pressure regulator valve 60. As the pressure of the air is varied, coefficients $\alpha$ and $\beta$ of the rotation speed of the actuator 10 may be varied.

The coefficients $\alpha$ and $\beta$ of load torque may be tuning coefficients set to appropriate values according to a load model. When the specification of an air compressor, which is the actuator 10, is determined, and the range of pressure at an exit end of the air compressor is determined, the coefficients $\alpha$ and $\beta$ may be tuned and applied depending on the pressure supplied by the air compressor.

According to another embodiment, the actuator 10 may be a motor of a coolant pump for circulating a coolant for cooling the fuel cell 50. The actuator 10 may circulate a coolant as an output shaft thereof is positioned and driven in the coolant.

The current provider 20 may be an inverter for controlling pulse width modulation (PWM) of current in three phases (U phase, V phase, and W phase) in the actuator 10.

The controller 30 may estimate the rotation position or the rotation speed of the actuator 10 at a pulse width modulation (PWM) period in a section in which the current of the current provider 20 is turned off.

That is, the period $\Delta t$ at which the controller 30 estimates the rotation speed may be set to be the same as the pulse width modulation (PWM) period.

The controller 30 may include a speed controller 31 for generating a current command based on the speed command and the estimated rotation speed, and a current controller 32, for estimating a voltage command of the current provider 20 based on the current command and the estimated rotation position.

The speed controller 31 may generate a current command (Id*, Iq*) to follow the speed command received from the high-ranking controller 30, and may perform feedback control for receiving feedback of the estimated rotation speed.

The current controller 32 may generate a voltage command (Vd*, Vq*) of the current provider 20 based on the current command (Id*, Iq*) received from the speed controller 31, and may generate the voltage command (Vd*, Vq*) based on the estimated rotation position. In addition, the current controller 32 may perform feedback control for receiving feedback of current sensed by the sensor 40.

A coordinate converter may be further provided between the current controller 32 and the current provider 20. The current controller 32 may receive a current target value (Id*, Iq*) of a synchronous coordinate system from the speed controller 31, and may transmit a voltage target value (Vd*, Vq*) of the synchronous coordinate system to the coordinate converter, and the coordinate converter may convert the voltage target value of the synchronous coordinate system to a three-phase voltage target value (U phase, V phase, and W phase) and may provide the same to the current provider 20.

The current provider 20 may provide driving current of three phases to the actuator 10 through a PWM output duty of a three-phase switching circuit based on the received three-phase voltage target value (U phase, V phase, and W phase).

Figure 6:
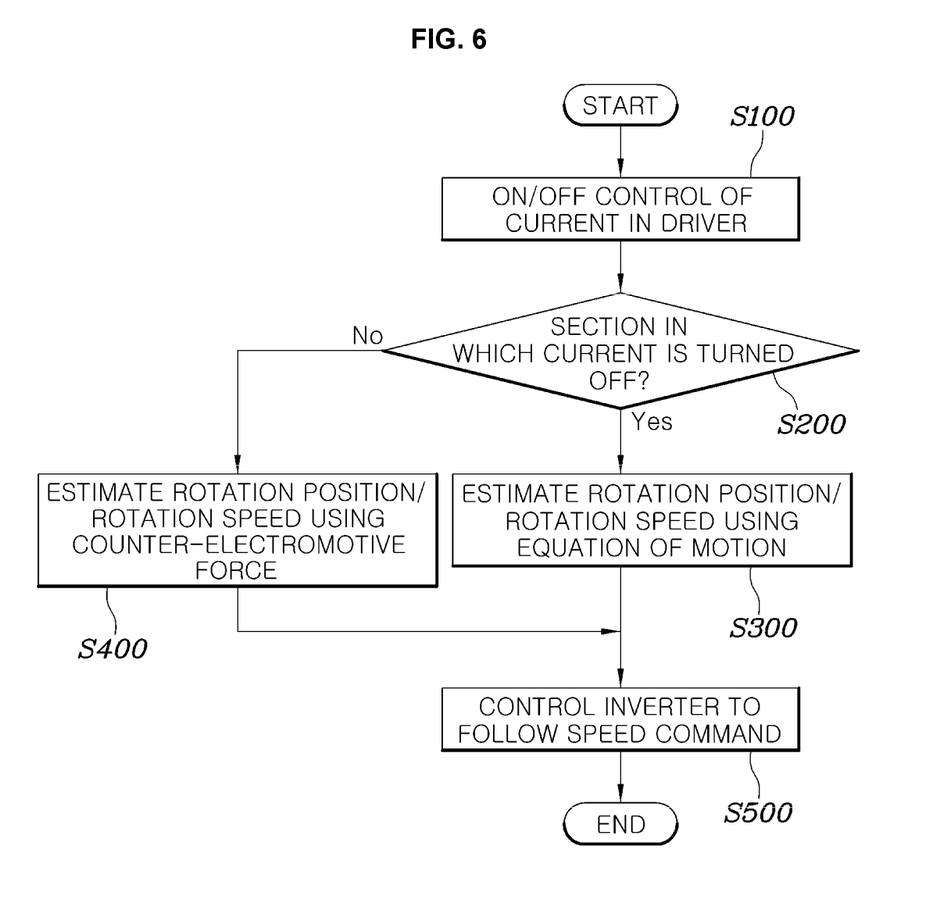
FIG. 6 is a flowchart showing a motor-driving control method according to an embodiment of the present disclosure.

FIG. 6 is a flowchart showing a motor-driving control method according to an embodiment of the present disclosure.

Further referring to FIG. 6, the motor-driving control method according to an embodiment of the present disclosure may include providing current applied to the actuator 10 for generating rotational force from the current provider 20 while repeatedly turning on and off the current at a preset period and duty (S100), estimating a rotation position or a rotation speed of the actuator 10 in one or more sections in which the current of the current provider 20 is turned on and off (S300 and S400), and controlling the current provider 20 to follow a speed command based on the estimated rotation position or rotation speed (S400).

The motor-driving control method may further include checking whether the current section is a section in which the current of the current provider 20 is turned on or a section in which the current is turned off (S200) prior to estimating the rotation position or the rotation speed (S300).

In the checking step (S200), when the current section is a section in which the current of the current provider 20 is turned off, the rotation position or the rotation speed of the actuator 10 may be estimated based on the equation of motion in which rotational force formed by driving the actuator 10 is assumed to be 0 (S300) in the estimating the rotation position or the rotation speed (S300 and S400).

In the checking step (S200), when the current section is a section in which the current of the current provider 20 is turned on, the counter-electromotive force generated by the actuator 10 may be estimated using the current or voltage sensed by the sensor 40, and the rotation position or the rotation speed of the actuator 10 may be estimated based on the counter-electromotive force estimated in the section in which the current of the current provider 20 is turned on (S400) in the estimating the rotation position or the rotation speed (S300 and S400).

The actuator 10 may be a motor installed in an aerodynamic force part or a hydraulic force part, and in estimating the rotation position or the rotation speed (S300 and S400), the rotation position or the rotation speed of the actuator 10 may be estimated using a load torque received from the aerodynamic force part or the hydraulic force part by the actuator 10 based on the pre-estimated rotation speed of the actuator 10 (S400).

In providing current applied to the actuator 10 while repeatedly turning on and off the current, an inverter may control pulse width modulation (PWM) of current in three phases (U phase, V phase, and W phase) in the actuator 10.

In estimating the rotation position or the rotation speed (S300 and S400), the rotation position or the rotation speed of the actuator 10 may be estimated at a pulse width modulation (PWM) period in a section in which current from the current provider 20 is turned off (S300).

Figure 7:
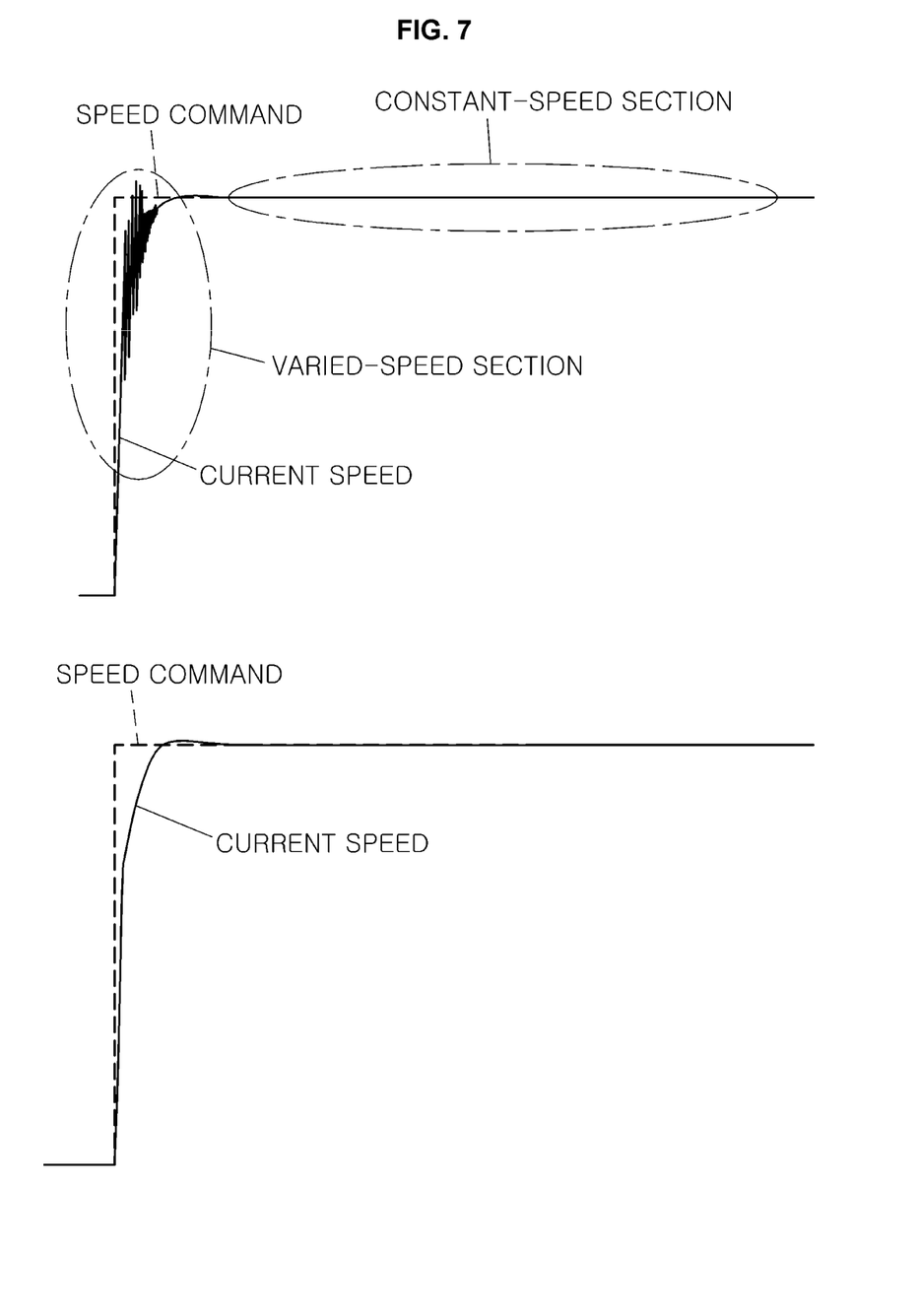
FIG. 7 is a set of graphs showing the rotation speed of a motor that follows a speed command according to the prior art and the present disclosure.

FIG. 7 is a set of graphs showing the rotation speed of a motor that follows a speed command according to the prior art and the present disclosure. In particular, a first graph shows the rotation speed of a motor that follows a speed command according to the prior art, and a second graph shows the rotation speed of a motor that follows a speed command according to the present disclosure.

Further referring to FIG. 7, according to the prior art, it may be seen that the rotation speed of the motor varies in a section in which the motor rotates at a constant speed, and in particular, it may be seen that the rotation speed of the motor varies seriously in a section in which the motor rotates at a varied speed and the rotation speed follows the speed command.

In contrast, according to the present disclosure, it may be seen that the rotation speed of the motor stably follows the speed command.

The motor-driving control system and method according to the present disclosure may achieve an effect of estimating a rotation speed and a rotation position of a motor in a section in which current is turned off without a sensor for sensing the rotation speed and the rotation position of the motor.

Accordingly, an effect of reducing the cost of the motor and simultaneously enhancing the operating efficiency of the motor and the stability of motor control may be achieved.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A motor-driving control system, comprising:
an actuator configured to generate rotational force by being driven using received current;
a current provider configured to provide current to the actuator while repeatedly turning on and off the current at a preset period and duty; and
a controller configured to:
estimate a rotation position or a rotation speed of the actuator in a section in which the current of the current provider is turned on or off; and
control the current provider to follow a speed command based on the estimated rotation position or rotation speed;
wherein the controller estimates the rotation speed of the actuator in the section in which the current of the current provider is turned off based on a previous rotation speed, a damping coefficient of the actuator, an inertia moment coefficient of the actuator, a load torque of the actuator, and an estimated period of the rotation speed.

2. The motor-driving control system of claim 1, further comprising:
a sensor configured to sense the current or a voltage applied to the actuator from the current provider,
wherein the controller estimates a counter-electromotive force generated in the actuator using the current or the voltage sensed by the sensor, and estimates the rotation position or the rotation speed of the actuator based on the counter-electromotive force in the section in which the current of the current provider is turned on.

3. The motor-driving control system of claim 1, wherein the controller estimates the rotation position or the rotation speed of the actuator based on an equation of motion in which a rotational force formed by driving the actuator is assumed to be 0 in the section in which the current of the current provider is turned off.

4. The motor-driving control system of claim 3, wherein the controller estimates the rotation speed of the actuator using a following equation in the section in which the current of the current provider is turned off:

$$\omega_n = \frac{\omega_{n-1} - \frac{\Delta t}{J} \cdot T_m}{1 + \frac{B \cdot \Delta t}{J}}$$

where $\omega_n$ is a current rotation speed, $\omega_{n-1}$ is a previous rotation speed, B is a damping coefficient of the actuator, J is an inertia moment coefficient of the actuator, $T_m$ is a load torque of the actuator, and $\Delta t$ is an estimated period of the rotation speed.

5. The motor-driving control system of claim 4, wherein the load torque of the actuator is estimated as a quadratic function for the rotation speed of the actuator using a following equation:

$$T_m = \alpha \omega_n^2 + \beta \omega_n,$$

where $\alpha$ is a second-order coefficient, and $\beta$ is a first-order coefficient.

6. The motor-driving control system of claim 5, wherein the actuator is a motor installed in an aerodynamic force part or a hydraulic force part, and the second-order coefficient $\alpha$ and the first-order coefficient $\beta$ are pre-mapped or preset depending on a pressure of the aerodynamic force part or the hydraulic force part.

7. The motor-driving control system of claim 1, wherein the current provider is an inverter configured to control pulse width modulation (PWM) of current in three phases (U phase, V phase, and W phase) in the actuator.

8. The motor-driving control system of claim 7, wherein the controller estimates the rotation position or the rotation speed of the actuator at a pulse width modulation (PWM) period in the section in which the current of the current provider is turned off.

9. The motor-driving control system of claim 1, wherein the controller includes a speed controller configured to generate a current command based on the speed command and the estimated rotation speed, and a current controller configured to generate a voltage command of the current provider based on the current command and the estimated rotation position.

10. A motor-driving control method comprising:
   providing current, by a current provider, to an actuator configured to generate a rotational force from the current provider while repeatedly turning on and off the current at a preset period and duty;
   estimating, by a controller, a rotation position or a rotation speed of the actuator in a section in which the current of the current provider is turned on or off; and
   controlling, by the controller, the current provider to follow a speed command based on the estimated rotation position or rotation speed;
   wherein estimating the rotation position or the rotation speed includes estimating a current rotation speed of the actuator in the section in which the current of the current provider is turned off based on a previous rotation speed, a damping coefficient of the actuator, an inertia moment coefficient of the actuator, a load torque of the actuator, and an estimated period of the rotation speed.

11. The motor-driving control method of claim 10, further comprising:
   prior to estimating the rotation position or the rotation speed, checking whether the section is the section in which the current of the current provider is turned on or the section in which the current is turned off.

12. The motor-driving control method of claim 11, wherein in the checking, when the section is the section in which the current of the current provider is turned off, estimating the rotation position or the rotation speed includes estimating the rotation position or the rotation speed of the actuator based on an equation of motion in which a rotational force formed by driving the actuator is assumed to be 0.

13. The motor-driving control method of claim 12, wherein:
   the actuator is a motor installed in an aerodynamic force part or a hydraulic force part; and
   estimating the rotation position or the rotation speed includes estimating the rotation position or the rotation speed of the actuator using a load torque received from the aerodynamic force part or the hydraulic force part by the actuator based on a previously estimated rotation speed of the actuator.

14. The motor-driving control method of claim 10, wherein providing the current applied to the actuator while repeatedly turning on and off the current includes controlling pulse width modulation (PWM) of current in three phases (U phase, V phase, and W phase) in the actuator.

15. The motor-driving control method of claim 14, wherein estimating the rotation position or the rotation speed includes estimating the rotation position or the rotation speed of the actuator at a pulse width modulation (PWM) period in the section in which the current of the current provider is turned off.

* * * * *